(12) United States Patent
Carignan et al.

(10) Patent No.: US 10,505,222 B2
(45) Date of Patent: Dec. 10, 2019

(54) PRESSURIZED LITHIUM METAL POLYMER BATTERY

(71) Applicant: Blue Solutions Canada Inc., Boucherville (CA)

(72) Inventors: Claude Carignan, Varennes (CA); Jonathan Mortreux, St-Lambert (CA); Yvan Roy, St-Hubert (CA); Guy Gilbert, Boucherville (CA); Alain Vallee, Varennes (CA)

(73) Assignee: BLUE SOLUTIONS CANADA INC., Boucherville (CA)

( * ) Notice: Subject to any disclaimer, the term of this patent is extended or adjusted under 35 U.S.C. 154(b) by 0 days.

(21) Appl. No.: 15/491,189

(22) Filed: Apr. 19, 2017

(65) Prior Publication Data
US 2017/0301951 A1 Oct. 19, 2017

Related U.S. Application Data

(60) Provisional application No. 62/324,735, filed on Apr. 19, 2016.

(51) Int. Cl.
H01M 10/0565 (2010.01)
H01M 10/0525 (2010.01)
H01M 2/02 (2006.01)
H01M 4/131 (2010.01)
H01M 4/134 (2010.01)
H01M 4/38 (2006.01)
H01M 4/40 (2006.01)
H01M 4/48 (2010.01)
H01M 4/02 (2006.01)
H01M 10/04 (2006.01)
(Continued)

(52) U.S. Cl.
CPC ....... *H01M 10/0565* (2013.01); *H01M 4/382* (2013.01); *H01M 10/049* (2013.01); *H01M 10/052* (2013.01); *H01M 10/0583* (2013.01); *H01M 10/0585* (2013.01); *H01M 10/0587* (2013.01); *Y02T 10/7011* (2013.01)

(58) Field of Classification Search
CPC ............. H01M 10/0565; H01M 4/382; H01M 10/0525; H01M 2/0237; H01M 4/48; H01M 4/131; H01M 4/405; H01M 4/134; H01M 2004/028; H01M 2004/027; H01M 2220/20
See application file for complete search history.

(56) References Cited

U.S. PATENT DOCUMENTS 6,451,474 B1 9/2002 Kozu et al.
6,664,006 B1 12/2003 Munshi
(Continued)

FOREIGN PATENT DOCUMENTS

EP 1760805 A2 3/2007
JP H04294071 A 10/1992
JP 2002110239 A 4/2002

OTHER PUBLICATIONS

English machine translation of JP2009-295446 (Year: 2009).*
(Continued)

*Primary Examiner* — Lisa S Park
(74) *Attorney, Agent, or Firm* — BCF LLP

(57) ABSTRACT

A lithium metal polymer battery comprising a rigid casing and at least one electrochemical cell; the battery assembled without an active mechanical pressure system.

11 Claims, 2 Drawing Sheets

(51) Int. Cl.
    *H01M 10/052*     (2010.01)
    *H01M 10/0583*     (2010.01)
    *H01M 10/0585*     (2010.01)
    *H01M 10/0587*     (2010.01)

(56) References Cited

U.S. PATENT DOCUMENTS

| | | |
|---|---|---|
| 2004/0115527 A1 | 6/2004 | Hiratsuka et al. |
| 2007/0037044 A1* | 2/2007 | Sato .................. H01M 2/0267 429/96 |
| 2008/0076026 A1* | 3/2008 | Ryu ................ H01M 10/0565 429/189 |
| 2009/0023059 A1 | 1/2009 | Kinoshita et al. |
| 2012/0231299 A1 | 9/2012 | Dai et al. |
| 2014/0004398 A1 | 2/2014 | Reynier et al. |
| 2014/0315071 A1 | 10/2014 | Kobayahsi et al. |
| 2015/0048783 A1 | 2/2015 | Albertus et al. |
| 2015/0295274 A1* | 10/2015 | Engel ................ H01M 10/0562 429/306 |
| 2016/0079579 A1 | 3/2016 | Jung |

OTHER PUBLICATIONS

English translation of JP H04294071A.
English translation of JP 2002110239A.
Supplementary European Search Report issued in corresponding European patent application No. 1778518.8 dated Sep. 3, 2019.

* cited by examiner

PRESSURIZED LITHIUM METAL POLYMER BATTERY

FIELD OF THE INVENTION

The present invention relates to a lithium metal polymer battery operating at temperatures and more specifically to a lithium metal polymer battery without a mechanical system to maintain the electrochemical cells of the battery under pressure.

BACKGROUND OF THE INVENTION

Lithium metal polymer batteries are typically built as large format batteries of 20 kWh or more for use in electric vehicle, in stationary applications for back-up to ensure continuity to applications that cannot afford a grid power outage such as telecommunication stations, data centers, etc., or to provide alternate power source for peak shaving purposes in industrial or residential buildings.

Lithium metal polymer batteries consist of one or more elementary electrochemical cell laminates comprised of thin layers, each laminate including an anode or negative electrode made of a lithium or lithium alloy metallic sheet layer, a cathode or positive electrode film layer made of an electroactive active material in a polymer-salt binder spread onto a metallic current collector, and a solid electrolyte comprising a thin layer of a polymer and a lithium salt mixture separating the positive and negative electrodes and providing ionic conductivity between the electrodes. More specifically, the positive electrode consists of electrochemically active material particles, an electronically conductive additive and a solid polymer electrolyte which acts as a binder and provides the required ionic path between the electrochemically active particles and the adjacent solid electrolyte separator.

It is well established that the performance and service-life of a lithium metal polymer batteries are significantly improved by maintaining the layers of the electrochemical cell laminates in a state of compression. In a state of compression, the ionic migration at the various interfaces is improved and the potential dendrite growth on the surfaces of the lithium metallic sheet is significantly reduced. The thermal conduction characteristics of a stack of electrochemical cells are also significantly improved when forced contact between adjacent cells is maintained. Improved performance and service-life has been achieved by maintaining pressure on the laminates with a mechanical pressure system comprising a series of spring-type elements which apply compressive forces on the opposing surfaces of the laminates throughout the battery cycle (charge-discharge).

The necessity of including a mechanical pressure system in the design of a lithium metal polymer battery has limited the configuration of such battery to a prismatic layout consisting of a plurality of laminates stacked one on top of the other to form a prismatic electrochemical cell and stacking a plurality of prismatic electrochemical cells one on top of the other to form a large format battery. Otherwise the lithium metal polymer battery could be made of a single laminate spiral rolled to form a cylindrical battery or flat rolled to form a flat wound prismatic battery but the mechanical pressure system would be much more complex and difficult to assemble into a cylindrical or semi-cylindrical container or casing.

The mechanical pressure system requires spring-type mechanism because cyclical volume changes occur in the charge and discharge cycles of the lithium metal polymer electrochemical cell. The volume of an electrochemical cell expands and retracts during charge and discharge cycle respectively due to the migration of lithium ions between the lithium metal anode and the lattice structure of the cathode material. During the charge cycle, the lithium ions migrate out of the lattice structure of the cathode material and are plated onto the surfaces of the lithium metal sheet of the anode thereby increasing the thickness of the anode and therefor its volume by as much as 8%. In the discharge cycle, the lithium ions plated onto the surfaces of the lithium metal sheet of the anode migrate back to the cathode and are inserted back into the lattice structure of the cathode material thereby reducing the thickness of the anode and its volume by the same 8%.

Lithium metal polymer batteries uses a solid polymer electrolyte rendering this technology extremely safe. However, to obtain optimal ionic conductivity and therefore optimal performance, the electrochemical cells must be heated to temperatures of 60° C. to 80° C. Lithium metal polymer batteries therefore include a heating system to maintain the battery at a nominal temperature of about 40° C. and to rapidly raise the temperature of the electrochemical cells to between 60° C. and 80° C. in operation. The rise in temperature of the electrochemical cells also results in thermal expansion of the volume of the cells by an additional 3%.

In modules or batteries comprising numerous thin-film electrochemical cells in a stack configuration, the volume change resulting from ionic migration and thermal expansion is compounded such that the overall volume change is significant and must be accommodated.

In order to accommodate these compounded variations in electrochemical cell volume resulting from charge and discharge cycling of a grouping of electrochemical cells, an active mechanical pressure system comprising spring-type elements adjacent to the walls of the container or casing is typically used to absorb these large variations of volume while maintaining an evenly distributed pressure onto the electrochemical cell stack throughout the volume expansion and volume reduction during charge/discharge cycling. For large battery applications, the active mechanical pressure system typically comprised of a plurality of metal springs applying pressure against a metal plate which can generate the necessary compressive force throughout the volume expansion and reduction, and may also include spring inserts located between adjacent electrochemical cells within the cell stack to enhance distribution of compressive forces within the cell stack.

An active mechanical pressure system as described above is bulky and represents a weight penalty which by default decreases the energy density (W/Kg) of the lithium metal polymer battery. Furthermore, as described above, the mechanical pressure system limits the configuration of a lithium metal polymer battery to a prismatic layout otherwise the lithium metal polymer battery could have a cylindrical configuration or a flat wound prismatic configuration.

Thus, there is a need for a lithium metal polymer battery designed and assembled without a mechanical pressure system to maintain the electrochemical cells of the battery under pressure.

SUMMARY OF THE INVENTION

It is an object of the present invention to ameliorate at least some of the inconveniences present in the prior art.

In one aspect, the invention provides a lithium metal polymer battery comprising a rigid casing and at least one electrochemical cell; the battery assembled without an active mechanical pressure system.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
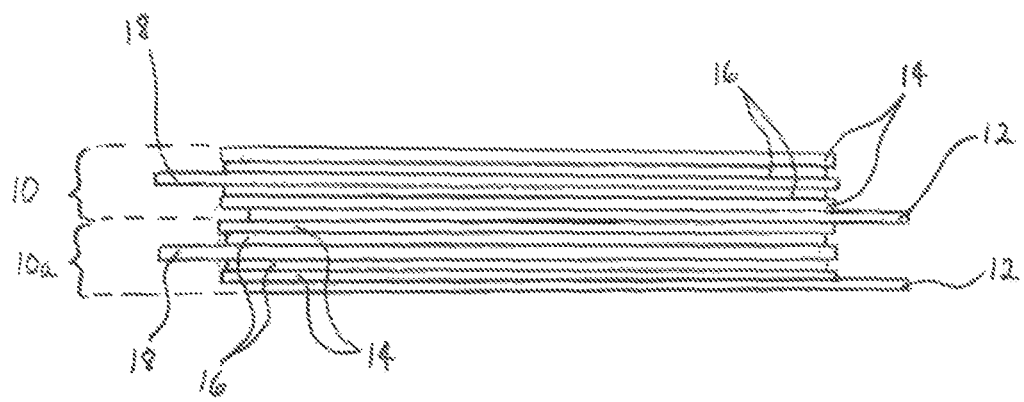
FIG. 1 is a schematic cross sectional view of two elementary bi-face lithium metal polymer laminates stacked one on top of the other.

FIG. 1 illustrates schematically two elementary bi-face lithium metal polymer laminates 10 and 10a stacked one on top of the other. Each elementary laminate 10 comprising a central metallic current collector 18, a layer of cathode or positive electrode 16 consisting of an electrochemically active material in a polymer-salt binder spread onto both surfaces of the central metallic current collector 18, a thin layer of a solid polymer electrolyte 14 on each layer of cathode 16 and an anode or negative electrode 12 consisting of a lithium or lithium alloy metallic sheet disposed on one of the two layers of solid polymer electrolyte 14. The elementary bi-face lithium metal polymer laminates 10 and 10a are stacked such that the lithium metal anode 12 of the first laminate 10 is in contact with the layer of solid polymer electrolyte 14 of the second laminate 10a such that both surfaces of the lithium metal anode 12 are active in the ionic process. Each layer of solid polymer electrolyte 14 separates the cathode layers 16 from the lithium metal anodes 12 and provides ionic conductivity between the negative and positive electrodes 12 and 16. A plurality of elementary bi-face lithium metal polymer laminates 10 and 10a are stacked one on top of the other to form an electrochemical cell 22.

In the past, the electrochemically active material of the cathode 16 of a Lithium metal polymer batteries consisted of a vanadium oxide ($V_2O_5$ or $V_3O_8$). When the laminates, electrochemical cells and battery are manufactured and assembled, these electrochemically active materials are initially depleted of lithium ion and the source of lithium ions is the lithium metal anode. The elementary bi-face lithium metal polymer laminate 10 is therefore initially fully charge when first assembled and is therefore at its maximum volume as previously described. The electrochemical cells and battery comprising vanadium oxides as the cathode electrochemically active materials are therefore assembled and installed in a rigid casing at their maximum volume and the volume of the electrochemical cells is reduced to its minimum volume on the discharge cycle as the lithium ions migrate from the surfaces of the lithium metal sheet into the lattice structure of the cathode material. The mechanical pressure system is therefore crucial to maintain the electrochemical cells under pressure while compensating for the reduction of volume of the electrochemical cells in the initial discharge cycle of the lithium metal battery.

However, other cathode electrochemically active materials generally included in Li-ion Batteries may be combined with a lithium metal anode to form a Lithium Metal Polymer batteries such as cathode electrochemically active materials having olivine lattice structures such as $LiMPO_4$ (M: Co, Fe, Ni, Mn and combinations), spinel structures such as $LiMn_2O_4$ and variants (LMO) and layered structures $LiCoO_2$, NCA and NMC, which are prepared in the lithiated (discharge) state. These materials are less toxic and more environmentally friendly than the vanadium based materials and have emerged as safer cathode materials. Lithium Metal Polymer batteries comprising an olivine, spinel or layered type active material as the cathode material still require to be maintained in a state of compression in order to obtain superior performance and service-life and therefore still require a mechanical pressure system.

Cathode materials comprising olivine structures, spinel structures or layered structures as described above are initially filled with lithium ions inserted into their lattice structure and are therefore the initial source of lithium ions of the assembled electrochemical cell and battery. The lithium metal anode may therefore be made thinner as it is not the initial source of lithium ions and the initial cycle of such a battery is a charge cycle in which the lithium ions migrate out of the lattice structure of the material and are plated onto the surfaces of the lithium metal sheet of the anode thereby increasing the thickness of the lithium metal anode and therefor its volume.

Lithium Metal Polymer batteries comprising cathodes having an electrochemically active material of the olivine, spinel or layered type structures are still assembled into a rigid casing with a bulky active mechanical pressure system comprising spring-type elements to maintain the electrochemical cells under compression and to compensate for the variations of volume of the electrochemical cells during charge and discharge.

However, it was discovered that this bulky active mechanical pressure system which represents a weight penalty that decreases the energy density (W/Kg) of the battery and also limits the configuration of a lithium metal polymer battery to a prismatic layout could be eliminated from the Lithium Metal Polymer battery by exploiting the fact that the laminates and electrochemical cells made with cathodes having electrochemically active material of the olivine, spinel or layered type structures are in a discharge state and therefore are at their minimum volume as previously described. The volume of the laminates and electrochemical cells will expand on the first charge cycle once they are assembled into batteries including the rigid casing.

Figure 2:
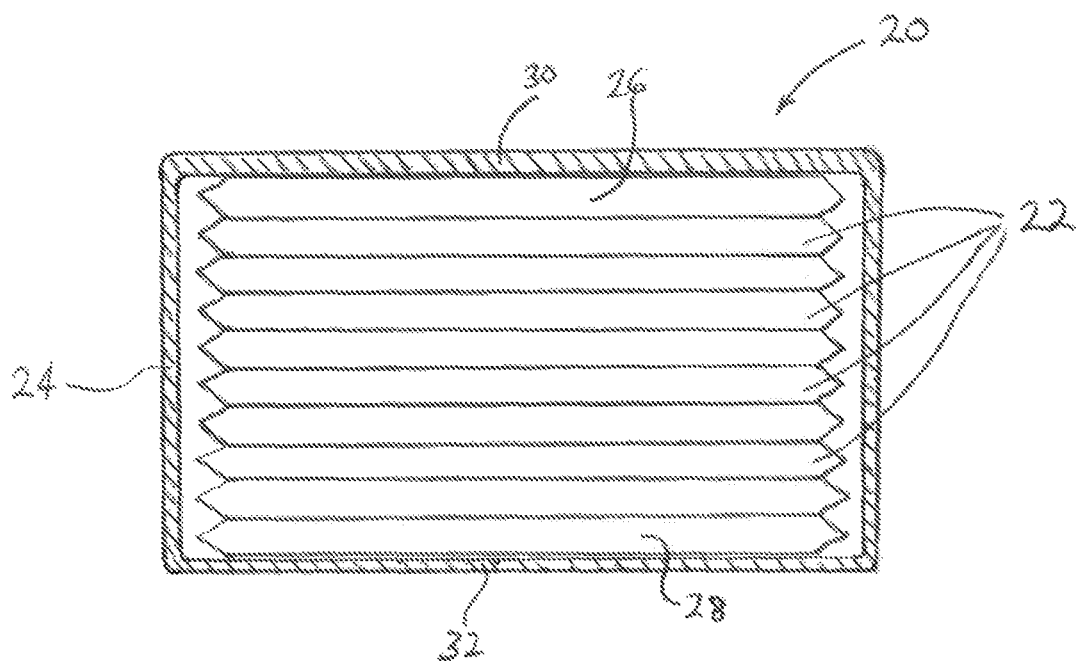
FIG. 2 is a schematic cross sectional view of one embodiment of a battery having a plurality of prismatic electrochemical cells.

FIG. 2 illustrates schematically a Lithium metal Polymer battery 20 comprising a plurality of prismatic electrochemical cells 22 stacked one on top of the other inserted in a rigid casing 24 and electrically connected together in series or parallel depending on the application requirements. As illustrated, the battery does not feature an active mechanical pressure system. The stack of prismatic electrochemical cells 22, which is in a discharge state and therefore at its minimum volume was inserted directly into the rigid casing and as illustrated, the wide surfaces of first and last prismatic electrochemical cells 26 and 28 abut directly against the upper and lower walls 30 and 32 of the rigid casing 24.

Initially, the mechanical pressure on the stack of prismatic electrochemical cells 22 is near zero. The stack of prismatic electrochemical cells 22 could be compressed marginally prior to insertion into the rigid casing 24 to facilitate the insertion such that when the compression force on stack of prismatic electrochemical cells 22 is released, the stack of prismatic electrochemical cells 22 would return to its initial volume and expand marginally to abut against the upper and lower walls 30 and 32 of the rigid casing 24 and the mechanical pressure of the resistance of the upper and lower walls 30 and 32 on the stack of prismatic electrochemical cells 22 would be above zero.

Once the stack of prismatic electrochemical cells 22 is inserted into the rigid casing 24, the rigid casing 24 is hermetically sealed to complete the lithium metal polymer battery 20. The battery 20 is initially heated by a heating system (not shown) in order to reach its operating temperature of between 60° C. and 80° C. During the initial heating phase, the stack of prismatic electrochemical cells 22 goes through an initial thermal expansion in which its volume increase by about 3% with the effect that the mechanical pressure of the upper and lower walls 30 and 32 resisting the thermal expansion on the stack of prismatic electrochemical cells 22 increases to an initial operating pressure of about 20-100 psi. It should be noted that the initial mechanical pressure caused by the thermal expansion of the stack of prismatic electrochemical cells 22 will eventually decrease as the polymers of each individual laminate 10 of each electrochemical cell 22 soften and settle under the initial mechanical pressure.

Once the operating temperature of the Lithium Metal Polymer battery 20 is reached, a first charge cycle is initiated to fully charge the new battery 20. Throughout the charge cycle, lithium ions stored inside the lattice structure of the cathode electrochemically active material migrate out of the lattice structure of the cathode and are plated onto the surfaces of the lithium metal sheet of the anode thereby increasing the thickness of the lithium metal anode and therefore expanding the volume of each laminate 10 of each prismatic electrochemical cell 22 by a further 5% resulting in a further increase in the mechanical pressure exerted by the upper and lower walls 30 and 32 of the rigid casing 24 on the stack of prismatic electrochemical cells 22 as the rigid casing 24 resists the volume expansion caused by the lithium ions plating on the lithium metal sheet of the anode during charge. The mechanical pressure on the stack of prismatic electrochemical cells 22 when the battery 20 is fully charged reaches a maximum operating pressure of 400-800 psi.

A mechanical pressure in the neighborhood of 400 psi is more than adequate to maintain each laminate 10 of each electrochemical cell 22 of the stack of electrochemical cells 22 in the required state of compression that improves the performance and service-life of a Lithium Metal Polymer battery. As previously described, in a state of compression, the ionic migration at the various interfaces of the laminates 10 is improved and the potential dendrite growth on the surfaces of the lithium metallic sheet 12 is significantly reduced.

Improved performance and service-life of the lithium metal polymer battery 20 is therefore achieved without the use of a bulky active mechanical pressure system comprising a series of spring-type elements which apply compressive forces on the stack of electrochemical cells 22. Instead, the compressive forces are produced by the resistance of the walls 30, 32 of the rigid casing 24 to the volume expansion of the stack of electrochemical cells 22 though the charging cycle.

The new designs of the Lithium Metal Polymer battery 20 exploits the characteristic that the laminates and electrochemical cells made with cathodes having electrochemically active material of the olivine, spinel or layered type structures are initially in a discharge state and therefore are at their minimum volume in order to remove the prior bulky active mechanical pressure system and exploits the volume expansion of the stack of electrochemical cells 22 during the charge cycle to generate the required compressive forces through the mechanical resistance of the walls 30, 32 of the rigid casing 24 to the volume expansion of the stack of electrochemical cells 22.

In theory, during the discharge and charge cycles of the Lithium Metal Polymer battery 20, the pressure applied onto the stack of electrochemical cells 22 fluctuates between the maximum operating pressure at the beginning of the discharge cycle to the initial operating pressure at the end of the discharge cycle and from a near zero pressure at the beginning of the charge cycle to the maximum operating pressure at the end of the charge cycle. In operation, the Lithium Metal Polymer battery 20 is rarely in a fully discharge state such that the pressure applied by the walls of the rigid casing 24 onto the stack of electrochemical cells 22 is never zero but instead fluctuates between the maximum operating pressure at the beginning of the discharge cycle to a non-zero minimum pressure at the end of the discharge cycle and from the minimum pressure at the beginning of the charge cycle to the maximum operating pressure at the end of the charge cycle such that electrochemical cells 22 are subject to a compressive force throughout the charge discharge cycles and the chemistry of the electrochemical cells 22 is always under pressure.

To control the maximum pressure exerted by the upper and lower walls 30 and 32 of the rigid casing 24 on the stack of electrochemical cells 22, a layer of elastic material such as a hard foam layer or a hard rubber layer may be disposed between the upper wall 30 and the first prismatic electrochemical cell 26 and between the lower wall 30 and the last prismatic electrochemical cell 28. The layer of elastic material being designed to yield at a predetermined maximum pressure thereby limiting the maximum mechanical pressure to preserve the structural integrity of the rigid casing 24 and the integrity of the prismatic electrochemical cells 22.

With the elimination of the bulky active mechanical pressure system, the weight penalty which by default decreased the energy density (W/Kg) of a lithium metal polymer battery is removed and the Lithium Metal Polymer battery 20 has a higher energy density than Lithium Metal Polymer batteries of the prior art.

Furthermore, the elimination of the necessity of having an active mechanical pressure system to maintain the lithium metal polymer battery under pressure opened the possibility of new configurations of a Lithium Metal Polymer battery other than a prismatic layout such as a cylindrical configuration or a flat wound prismatic configuration.

Figures 3, 3A:
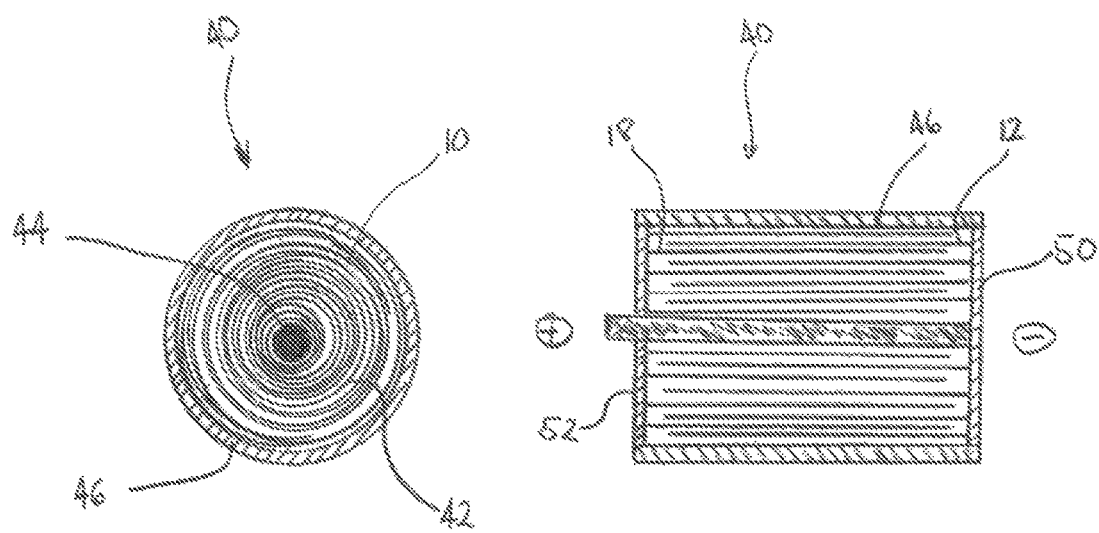
FIG. 3 is a schematic top plan view of one embodiment of a cylindrical battery having a spiral rolled cylindrical electrochemical cell.
FIG. 3a is a schematic cross sectional view of the cylindrical battery shown in FIG. 3.

FIG. 3 illustrates schematically a cylindrical lithium metal polymer battery 40 comprising a single elementary laminate 10 rolled multiple times into a spiral roll around a central post 44 to form a cylindrical electrochemical cell 42. The length of the single elementary laminate 10 defines the number of layers or turns in the spiral roll which defines the capacity of the cylindrical electrochemical cell 42. The cylindrical electrochemical cell 42 is initially rolled and then inserted into a rigid canister 46. As illustrated, the battery does not feature an active mechanical pressure system. The cylindrical electrochemical cell 42, which is in a discharge state and therefore at its minimum volume is inserted directly into the rigid canister 46 and the outer surface of the spiral roll abuts directly against the inner wall of the rigid canister 46.

Initially, the mechanical pressure on the cylindrical electrochemical cell 42 is near zero. However, The cylindrical electrochemical cell 42 could be compressed marginally prior to insertion into the rigid canister 46 to facilitate the insertion such that when the compression force on the cylindrical electrochemical cell 42 is released, the cylindrical electrochemical cell 42 would return to its initial volume and expand marginally to abut against the inner wall of the rigid canister 46 and the mechanical pressure of the resistance of the inner walls on the cylindrical electrochemical cell 42 would be non-zero.

Once the cylindrical electrochemical cell 42 is inserted into the rigid canister 46, the rigid canister 46 is hermetically sealed with a first metallic plate 50 which is electrically connected with the lithium metal anode 12 and serves as the negative battery poll and a second metallic plate 52 which is electrically connected with the current collector 18 and serves as positive battery poll. The cylindrical lithium metal polymer battery 40 is initially heated by a heating system (not shown) in order to reach its operating temperature of between 60° C. and 80° C. During the initial heating phase, the cylindrical electrochemical cell 42 goes through an initial thermal expansion in which its volume increase by about 3% with the effect that the mechanical pressure of the inner wall of the rigid canister 46 resisting the thermal expansion on the cylindrical electrochemical cell 42 increases to an initial operating pressure. As previously described with reference to FIG. 2, the initial mechanical pressure caused by the thermal expansion of the cylindrical electrochemical cell 42 will eventually decrease as the polymers of the laminate 10 soften and settle under the initial mechanical pressure.

Once the operating temperature of the cylindrical lithium metal polymer battery 40 is reached, a first charge cycle is initiated to fully charge the new battery 40. Throughout the charge cycle, lithium ions stored inside the lattice structure of the cathode electrochemically active material migrate out of the lattice structure of the cathode and are plated onto the surfaces of the lithium metal sheet of the anode thereby increasing the thickness of the lithium metal anode and therefore expanding the volume of the rolled laminate 10 of cylindrical electrochemical cell 42 by a further 5% resulting in a further increase in the mechanical pressure exerted by the inner wall of the rigid canister 46 on the cylindrical electrochemical cell 42 as the rigid canister resists the volume expansion caused by the lithium ions plating on the lithium metal sheet of the anode during charge. The mechanical pressure on the cylindrical electrochemical cell 42 when the battery 40 is fully charged reaches a maximum operating pressure.

The maximum operating pressure which may be between 400-800 psi is more than adequate to maintain the rolled laminate 10 of the cylindrical electrochemical cell 42 in the required state of compression that improves the performance and service-life of a lithium metal polymer battery. As previously described, in a state of compression, the ionic migration at the various interfaces of the laminate 10 is improved and the potential dendrite growth on the surfaces of the lithium metallic sheet 12 is significantly reduced.

As previously described with reference to Lithium Metal Polymer battery 20, to control the maximum pressure exerted by the inner wall of the rigid canister 46 on the cylindrical electrochemical cell 42, a layer of elastic material such as a hard foam layer or a hard rubber layer may be disposed between the inner wall of the rigid canister 46 and the cylindrical electrochemical cell 42 and/or by use of an elastic core as the central post 44. The layer of elastic material being designed to yield at a predetermined maximum pressure thereby limiting the maximum mechanical pressure in order to preserve the structural integrity of the rigid canister 46 and the integrity of the cylindrical electrochemical cell 42.

The characteristic that the laminates and electrochemical cells made with cathodes having electrochemically active material of olivine structures, spinel type structures or layered structures are initially in a discharge state and therefore are at their minimum volume makes it possible to assemble a lithium metal polymer battery with a cylindrical configuration because the required compressive force is generated through the mechanical resistance of the inner wall of the rigid canister 46 to the volume expansion of the cylindrical electrochemical cell 42 during the charge cycle and the active mechanical pressure system is no longer required.

Improved performance and service-life of the cylindrical lithium metal polymer battery 40 is therefore achieved without the use of a bulky active mechanical pressure system comprising a series of spring-type elements. Instead, the compressive force is produced by the mechanical resistance of the inner wall of the rigid canister 46 to the volume expansion of the cylindrical electrochemical cell 42.

Figure 4:
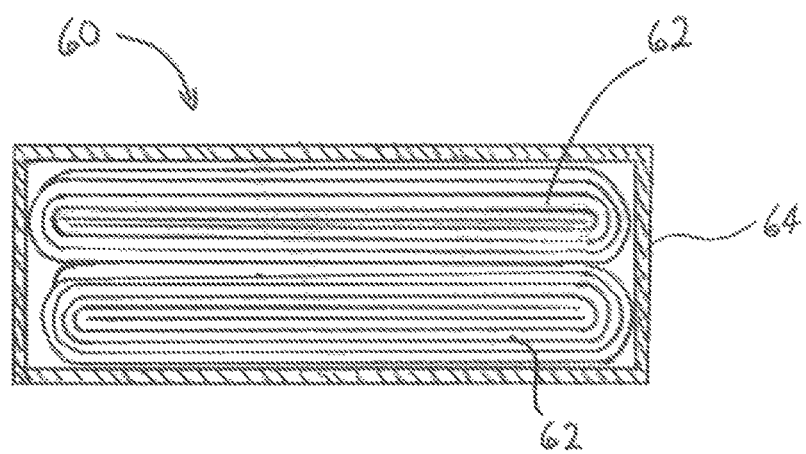
FIG. 4 is a schematic cross sectional view of one embodiment of a battery having a plurality of flat wound prismatic electrochemical cells.

FIG. 4 illustrates schematically a lithium metal polymer battery 60 comprising a pair of flat wound prismatic electrochemical cell 62. Each flat wound prismatic electrochemical cell 62 is made of a single elementary laminate 10 wound multiple times into a flat roll to form a flat wound prismatic electrochemical cell 62. The length of the single elementary laminate 10 defines the number of layers in the flat roll which defines the capacity of the flat wound prismatic electrochemical cell 62. The flat wound prismatic electrochemical cell 62 is initially flat rolled and then stacked one on top of the other. The stacked flat wound prismatic electrochemical cells 62 are inserted into a rigid casing 64. As illustrated, the battery 60 does not feature an active mechanical pressure system. The flat wound prismatic electrochemical cells 62, which are in a discharge state and therefore at their minimum volume are inserted directly into the rigid casing 64 and the outer surfaces of the stacked flat wound prismatic electrochemical cells 62 abuts directly against the inner wall of the rigid casing 64.

As previously described with reference to lithium metal polymer batteries 20 and 40, initially, the mechanical pressure on the stacked flat wound prismatic electrochemical cells 62 is near zero. However, The stacked flat wound prismatic electrochemical cells 62 could be compressed marginally prior to insertion into the rigid casing 64 to facilitate the insertion such that when the compression force on the stacked flat wound prismatic electrochemical cells 62 is released, the flat wound prismatic electrochemical cells 62 would return to their initial volume and expand marginally to abut against the inner walls of the rigid casing 64 and the mechanical pressure of the resistance of the inner walls on the stack of flat wound prismatic electrochemical cells 62 would be above zero.

Once the stack of flat wound prismatic electrochemical cells 62 is inserted into the rigid casing 64 and the rigid casing 64 is hermetically sealed. The flat wound prismatic electrochemical cells 62 are initially heated by a heating system (not shown) in order to reach their operating temperature of between 60° C. and 80° C. During the initial heating phase, the flat wound prismatic electrochemical cells 62 go through an initial thermal expansion in which its volume increase by about 3% with the effect that the mechanical pressure of the upper and lower inner walls of the rigid casing 64 resisting the thermal expansion on the flat wound prismatic electrochemical cells 62 increases to an initial operating pressure. As previously described with reference to FIGS. 2 and 3, the initial mechanical pressure caused by the thermal expansion of the flat wound prismatic electrochemical cells 62 will eventually decrease as the polymers of the laminate 10 soften and settle under the initial mechanical pressure.

Once the operating temperature of the flat wound prismatic lithium metal polymer battery 60 is reached, a first charge cycle is initiated to fully charge the new battery 60. Throughout the charge cycle, lithium ions stored inside the lattice structure of the cathode electrochemically active material migrate out of the lattice structure of the cathode and are plated onto the surfaces of the lithium metal sheet of the anode thereby increasing the thickness of the lithium metal anode and therefore expanding the volume of the laminate 10 of flat wound prismatic electrochemical cells 62 by a further 5% resulting in a further increase in the mechanical pressure exerted by the upper and lower walls of the rigid casing 64 on the flat wound prismatic electrochemical cells 62 as the rigid casing resists the volume expansion caused by the lithium ions plating on the lithium metal sheet of the anode during charge. The mechanical pressure on the flat wound prismatic electrochemical cells 62 when the battery 60 is fully charged reaches a maximum operating pressure.

As previously described, the maximum operating pressure which may be between 400 and 800 psi is more than adequate to maintain the laminate 10 of the flat wound prismatic electrochemical cells 62 in the required state of compression that improves the performance and service-life of a lithium metal polymer battery. As previously described, in a state of compression, the ionic migration at the various interfaces of the laminate 10 is improved and the potential dendrite growth on the surfaces of the lithium metallic sheet 12 is significantly reduced.

Again, to control the maximum pressure exerted by the upper and lower walls of the rigid casing 64 on the flat wound prismatic electrochemical cells 62, a layer of elastic material such as a hard foam layer or a hard rubber layer may be disposed between the upper and lower walls of the rigid casing 64 and the flat wound prismatic electrochemical cells 62. The layer of elastic material being designed to yield at a predetermined maximum pressure thereby limiting the maximum mechanical pressure to preserve the structural integrity of the rigid casing 64 and the integrity of the flat wound prismatic electrochemical cells 62.

The characteristic that the laminates and electrochemical cells made with cathodes having electrochemically active material of olivine structures, spinel type structures or layered structures are initially in a discharge state and therefore are at their minimum volume makes it possible to assemble a lithium metal polymer battery with a flat wound prismatic configuration because the required compressive force is generated through the mechanical resistance of the upper and lower walls of the rigid casing 64 to the volume expansion of the flat wound prismatic electrochemical cells 62 during the charge cycle and the active mechanical pressure system is no longer required.

Improved performance and service-life of the flat wound prismatic lithium metal polymer battery 60 is therefore achieved without the use of a bulky active mechanical pressure system comprising a series of spring-type elements. Instead, the compressive force is produced by the mechanical resistance of the upper and lower walls of the rigid casing 64 to the volume expansion of the flat wound prismatic electrochemical cells 62.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A lithium metal polymer battery comprising:
   a rigid casing having a first wall and a second wall opposite the first wall; and
   a plurality of electrochemical cells stacked in the rigid casing between the first and second walls,
   each electrochemical cell of the plurality of electrochemical cells comprising:
     an anode made of lithium or lithium alloy metallic sheet,
     a cathode made of an active material comprising olivine, spinel or layered structure in their lithiated state, and
     a solid polymer electrolyte disposed between the anode and the cathode,
   the plurality of electrochemical cells having a first thickness in a first state of the plurality of electrochemical cells whereby the first and second walls exert a first pressure on the plurality of electrochemical cells,
   the plurality of electrochemical cells having a second thickness in a second state of the plurality of electrochemical cells whereby the first and second walls exert a second pressure on the plurality of electrochemical cells,
   the second thickness being greater than the first thickness,
   the second pressure being greater than the first pressure,
   the first state being a discharged state,
   the second state being at least one of a charged state and a heated state where the plurality of electrochemical cells is thermally expanded, and
   the battery being free of an active mechanical pressure system.

2. A lithium metal polymer battery as defined in claim 1, wherein the electrochemical cells are assembled in a flat wound prismatic configuration.

3. A lithium metal polymer battery as defined in claim 1, further comprising a layer of elastic material positioned between the rigid casing and the plurality of electrochemical cells.

4. A lithium metal polymer battery as defined in claim 1, wherein the first wall is a lower wall of the rigid casing and the second wall is an upper wall of the rigid casing.

5. A lithium metal polymer battery as defined in claim 1, wherein in the heated state the plurality of electrochemical cells initially has a temperature between 60° C. and 80° C.

6. A lithium metal polymer battery as defined in claim 1, wherein in the second state a volume of the plurality of electrochemical cells is at least 3% higher than in the first state.

7. A lithium metal polymer battery as defined in claim 1, wherein the first pressure is greater than zero.

8. A lithium metal polymer battery as defined in claim 1, wherein the second pressure is at least 20 psi.

9. A lithium metal polymer battery as defined in claim 1, wherein the second pressure is between 400 and 800 psi.

10. A lithium metal polymer battery as defined in claim 1, wherein the second state is the charged state.

11. A lithium metal polymer battery as defined in claim 10, wherein the second state is the charged state and the heated state.

* * * * *